Jan. 28, 1958     O. A. KNEISEL     2,821,042
FISHING EQUIPMENT
Filed April 26, 1954
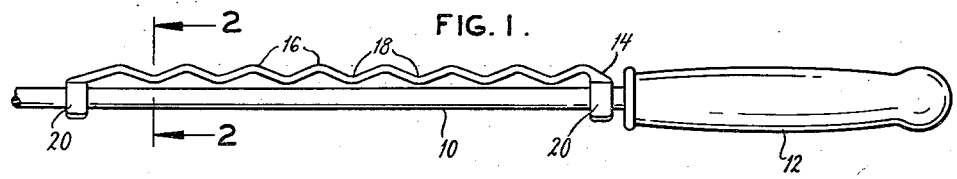
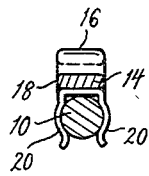
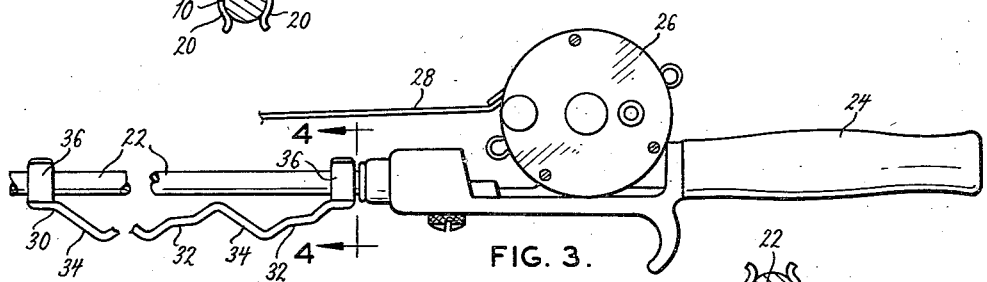
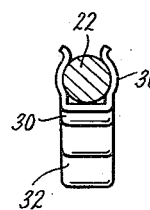
INVENTOR.
OTTO A. KNEISEL
BY
*Rey Eilers*
ATTORNEY United States Patent Office 2,821,042
Patented Jan. 28, 1958

2,821,042

FISHING EQUIPMENT

Otto A. Kneisel, St. Louis, Mo.

Application April 26, 1954, Serial No. 425,581

5 Claims. (Cl. 43—19.2)

This invention relates to improvements in fishing equipment. More particularly this invention relates to improvements in attachments for fishing rods.

It is therefore an object of the present invention to provide an improved attachment for fishing rods.

The movement of fishing rods, to cause artificial or inactive live bait to simulate active live bait, is complicated because of the increasing tendency toward flexible fishing rods. When a small amount of movement is applied to the butt end of a flexible fishing rod, that movement is amplified, by the flexibility of that rod, before it is applied to the tip of that rod; and frequently the amplified movement of the tip of the rod is so great that the bait is forced through the water in an unnatural manner. The overall result is that only expert anglers are able to closely approximate the action of active live bait when they are using inactive live bait or artificial bait. The present invention provides a vibration-imparting device that can be mounted on fishing rods and that will enable substantially all anglers to simulate the active live bait when they are using inactive live bait or artificial bait. The vibration-imparting device can be mounted on a rod by forming it as an integral part of that rod, by permanently attaching it to that rod, or by releasably attaching it to that rod. The vibration-imparting device will apply a series of regulated vibrations to the fishing rod; and those vibrations will be transmitted through the rod to the tip of that rod, and then through the fishing line to the lure. Those vibrations will be of small amplitude, so that although they are amplified by the length and flexibility of the rod, they will still be of small enough amplitude to avoid unnatural movement of the lure. The vibrations created by the vibration-imparting device of the present invention will cause the lure to move in the water in a very life-like way and will tempt the fish. It is therefore an object of the present invention to provide a motion-imparting device that can be mounted on a fishing rod and that will transmit vibrations to the tip of that rod for transference to the lure connected to the fishing line on that rod.

The vibration-imparting device of the present invention can be permanently mounted on the fishing rod or it can be releasably mounted on the rod. In either event, the vibration-imparting device will effectively transmit vibrations to the rod, adjacent the butt end of the rod, for transmission to the tip of the rod and thence to the fishing line and the lure.

The vibration-imparting device provided by the present invention can be manually operated; and with such a device the angler moves his finger along the surface of that device to create the desired vibrations. Specifically, the vibration-imparting device can be an elongated surface with a series of inwardly directed and outwardly directed portions that can be struck repeatedly by the finger of the angler to create the desired vibrations. It is therefore an object of the present invention to provide an elongated surface with a series of inwardly directed portions and outwardly directed portions which can be struck by the finger of the angler to create vibrations that will be transmitted through the rod to the tip of that rod, and then to the fishing line and the lure attached thereto.

Where an elongated surface is provided which can be struck by the finger of the angler, it is possible to vary the action applied to the lure by changing the elongated surface. Specifically, one elongated surface may have a configuration that simulates the action of a minnow, while another elongated surface can simulate the action of a frog. The angler can select the elongated surface which best meets the interests and inclinations of the fish at any particular time.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing,

Fig. 1 is a side elevational view of a vibration-imparting device mounted on the butt end of a straight pole fishing rod, Fig. 2 is a cross-sectional end view of the vibration-imparting device and fishing rod of Fig. 1, and it is taken along the plane indicated by the line 2—2 in Fig. 1.

Fig. 3 is a side elevational, broken view of another form of vibration-imparting device mounted on the butt end of a bait-casting rod, and Fig. 4 is a cross-sectional, end view of the vibration-imparting device and rod of Fig. 3, and it is taken along the plane indicated by the line 4—4 in Fig. 3.

Referring to the drawing in detail, the numeral 10 denotes a straight pole type of fishing rod. This rod may be of bamboo, cane, glass fibers, or any other material. The rod 10 is shown as being provided with a handle 12; but this handle is not essential. An elongated surface 14 constitutes a vibration-imparting device, and that surface has outwardly directed portions 16 and inwardly directed portions 18 intermediate the ends thereof. The outwardly directed portions 16 and the inwardly directed portions 18 are alternated, and they are contiguous with each other. Furthermore, the outwardly directed portions 16 are all similar, and the inwardly directed portions 18 are all similar. A plurality of resilient fingers 20 are secured to the surface 14, and they project outwardly from that surface. Each of the fingers 20 has an arcuate, concave rod-engaging area; and the fingers 20 are paired to provide resilient clips. These clips releasably secure the surface 14 to the rod 10.

The surface 14 and the resilient fingers 20 form a bridge which is held to the fishing rod, adjacent the butt end of that fishing rod, in unyielding relation. However, that bridge can be separated from the fishing rod, as desired, merely by forcing the resilient fingers 20 to yield in an outward direction.

If desired, the vibration-imparting device 14 can be formed integrally with the rod 10. Further, if desired, that device can be made as a separate unit and then permanently attached to the rod 10. However, it is most advantageous to have the device 14 releasably mounted on the rod 10.

The surface 14 will be adjacent the handle 12, of the rod 10, and will thus be within easy reach of the hands of the angler. The rod 10 will be used to cast the line, not shown, outwardly into the water; and once the line and the lure have been cast, the angler can move his finger along the surface 14. If the angler moves his finger so that it strikes only the outwardly directed portions 16, as will be the case if he moves his finger from the right to the left in Fig. 1, he will create vibrations in the fishing rod that will be transmitted to the top of that rod. Those vibrations will initially be of small amplitude, but that amplitude will be magnified by the time the vibrations reach the tip of the fishing rod 10. Those vibrations will then be imparted to the fishing line and transmitted through that line to the lure. The amplitude of the vibrations imparted to the lure will be such that the lure will move in a life-like way and will closely approximate the movement of active live bait. If the angler desires, he can cause his finger to strike only the inwardly inclined portions 18, as by moving his finger from the left to the right in Fig. 1. Such movement of the finger will have a result closely comparable to that attained when the finger is moved into engagement with the outwardly directed portions 16. Further, if desired, the angler can move his finger into engagement with the outwardly directed portions 16 on the outward stroke, and then move his finger into engagement with the inwardly directed portions 18 on the inward stroke. This increases the number of vibrations per minute, and enables the angler to simulate a high degree of activity of live bait. It is also possible to vary the amplitude of vibrations experienced by the tip of the rod by varying the pressure which the angler applies to the surface 14. Through these combinations of actions, almost any angler is able to simulate the movement of live bait in a realistic manner.

It will be desirable to keep the fishing line taut so the vibrations that are imparted to that line by the tip of the rod will not be attenuated unduly by slack in the line. Accordingly, the angler will slowly raise the tip of the rod as he moves his finger along the surface 14. When the rod is close to the vertical, the rod is either cast out again or line is taken in while the tip of the rod is lowered. Thereafter, the rod is again raised slowly while the angler's finger is moved along the surface 14.

The vibrations that are imparted to the bait will cause that bait to generate small amplitude waves in the water. These waves will transmit forces and sounds of low intensity to the vicinity of fish, and those forces and sounds will stimulate the interest of the fish. Hence the present invention provides a physical and aural, as well as a visual, interest for the fish.

The numeral 22 denotes a bait-casting rod. This rod has the usual handle 24, and it will have a reel 26 of the usual and standard type. The fishing line 28 is normally stored on the reel and is recurrently cast out during the fishing operation.

The numeral 30 denotes an elongated surface which is the motion-imparting device used with the rod 22. That surface has outwardly directed portions 32 and has inwardly directed portions 34. The outwardly directed portions 32 and the inwardly directed portions 34 are alternated, and they are contiguous. The outwardly directed portions 32 have bends intermediate the ends thereof. A plurality of resilient fingers 36 are secured to the surface 30, and they are paired to form springy clips. The fingers have arcuate rod-engaging areas which can effectively grip the rod and secure the surface 30 to that rod in unyielding relation.

The surface 30 differs from the surface 14 in that the configuration of the outwardly directed portions 32 is different from the configuration of the inwardly directed portions 34. Because of this difference in configuration, the angler is able to attain different actions of the lure, depending on the direction in which he moves his finger relative to the surface 30. Thus, when the angler moves his finger inwardly along the surface 30, that finger will strike the inwardly directed portions 34 and provide one type of action for the lure. When the angler moves his finger outwardly along the surface 30, that finger will engage the outwardly directed portions 32 and will provide a different action.

The surface 30 is shown to illustrate the fact that different configurations can be given to the outwardly inclined portions and the inwardly inclined portions of motion-imparting devices. It is not, however, intended to show the only such configurations for those portions, because those portions can have many different configurations.

By selecting elongated surfaces of the desired size and configuration, the angler can simulate various baits and the distinctive actions which they have. Moreover, the angler can vary the pressure with which his finger engages those surfaces, and can thus obtain variations of those actions of the bait. In that way the angler can simulate the actions which those bait give when wounded.

If desired, a pick or a thimble can be used to strike the surfaces 14 and 30. The use of a pick or thimble would assure the application to those surfaces of the full force contemplated.

The resilient fingers, shown in the drawing, are desirable securing elements; but the vibration-imparting devices could be secured to the rods by split rings that were selectively tightened by screws. Further, the vibration-imparting devices could be secured to the rods by water-resistant tapes of fabric or plastic. These other securing elements are quite usable.

Whereas the drawing and accompanying description have shown and described several preferred embodiments of the present invention, it should be apparent to those skilled in the art that various changes may be made in the form of the invention without affecting the scope thereof.

What I claim is:

1. A vibration-imparting device that can transmit a series of vibrations to a fishing rod adjacent the butt end of said fishing rod for transmission through said fishing rod to the tip of said fishing rod and thence through the fishing line on said fishing rod to the lure at the outer end of said fishing line and that comprises a structure that is mounted on said fishing rod adjacent the butt end of said fishing rod in unyielding relation and that is adapted to be struck repeatedly to impart a series of vibrations to said fishing rod adjacent the butt end of said fishing rod, said structure having a plurality of alternating outwardly inclined portions and inwardly inclined portions and gently arcuate portions that interconnect said inclined portions.

2. A vibration-imparting device that can transmit a series of vibrations to a fishing rod adjacent the butt end of said fishing rod for transmission through said fishing rod to the tip of said fishing rod and thence through the fishing line on said fishing rod to the lure at the outer end of said fishing line and that comprises a structure that is mounted on said fishing rod adjacent the butt end of said fishing rod in unyielding relation and that is adapted to be struck repeatedly to impart a series of vibrations to said fishing rod adjacent the butt end of said fishing rod, said structure having a plurality of alternating outwardly inclined portions, and inwardly inclined portions and gently arcuate portions that interconnect said inclined portions, said outwardly inclined portions having a configuration that is different from the configuration of said inwardly inclined portions.

3. A vibration-imparting device that can transmit a series of vibrations to a fishing rod adjacent the butt end of said fishing rod for transmission through said fishing rod to the tip of said fishing rod and thence through the fishing line on said fishing rod to the lure at the outer end of said fishing line and that comprises a structure that is mounted on said fishing rod adjacent the butt end of said fishing rod in unyielding relation and that is adapted to be struck repeatedly to impart a series of vibrations to said fishing rod adjacent the butt end of said fishing rod, said structure having a plurality of alternating outwardly inclined portions and inwardly inclined portions and gently arcuate portions that interconnect said inclined portions, said outwardly inclined portions having bends intermediate the ends thereof.

4. A vibration-imparting device that can transmit a series of vibrations to a fishing rod adjacent the butt end of said fishing rod for transmission through said fishing rod to the tip of said fishing rod and thence through the fishing line on said fishing rod to the lure at the outer end of said fishing line and that comprises a structure that is mounted on said fishing rod adjacent the butt end of said fishing rod in unyielding relation and that is adapted to be struck repeatedly to impart a series of vibrations to said fishing rod adjacent the butt end of said fishing rod, said structure having a plurality of alternating outwardly inclined portions and inwardly inclined portions and gently arcuate portions that interconnect said inclined portions, said outwardly inclined portions being similar to provide a uniform series of vibrations.

5. A vibration-imparting device that can transmit a series of vibrations to a fishing rod adjacent the butt end of said fishing rod for transmission through said fishing rod to the tip of said fishing rod and thence through the fishing line on said fishing rod to the lure at the outer end of said fishing line and that comprises a structure that is mounted on said fishing rod adjacent the butt end of said fishing rod in unyielding relation and that is adapted to be struck repeatedly to impart a series of vibrations to said fishing rod adjacent the butt end of said fishing rod, said structure having a plurality of alternating outwardly inclined portions and inwardly inclined portions, said outwardly inclined portions and said inwardly inclined portions being contiguous to and interconnected by gently arcuate portions.

References Cited in the file of this patent

UNITED STATES PATENTS

| 1,253,360 | Dominy | Jan. 15, 1918 |
| 1,336,756 | Pautzke | Apr. 13, 1920 |
| 2,624,145 | Wehn | Jan. 6, 1953 |

FOREIGN PATENTS

| 829,872 | Germany | July 25, 1933 |
| 77,882 | Sweden | July 25, 1933 |